United States Patent
Ganapathy et al.

(10) Patent No.: US 9,921,989 B2
(45) Date of Patent: Mar. 20, 2018

(54) METHOD, APPARATUS AND SYSTEM FOR MODULAR ON-DIE COHERENT INTERCONNECT FOR PACKETIZED COMMUNICATION

(71) Applicant: Intel Corporation, Santa Clara, CA (US)

(72) Inventors: Krishnakumar Ganapathy, Bangalore (IN); Yen-Cheng Liu, Portland, OR (US); Antonio Juan, Barcelona (ES); Steven R. Page, Hillsboro, OR (US); Jeffrey D. Chamberlain, Tracy, CA (US); Pau Cabre, Reus (ES); Bahaa Fahim, San Jose, CA (US); Gunnar Gaubatz, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 307 days.

(21) Appl. No.: 14/707,656

(22) Filed: May 8, 2015

(65) Prior Publication Data
US 2016/0012010 A1    Jan. 14, 2016

(30) Foreign Application Priority Data
Jul. 14, 2014 (EP) .................................. 14382274.0

(51) Int. Cl.
*G06F 13/00* (2006.01)
*G06F 13/40* (2006.01)
(Continued)

(52) U.S. Cl.
CPC ........ *G06F 13/4022* (2013.01); *G06F 9/4411* (2013.01); *G06F 13/4036* (2013.01);
(Continued)

(58) Field of Classification Search
USPC .................................. 710/13–117, 300–315
See application file for complete search history.

(56) References Cited

U.S. PATENT DOCUMENTS 8,984,228 B2    3/2015 Liu et al.
9,170,949 B2 *  10/2015 Moll ................. G06F 12/0831
(Continued)

FOREIGN PATENT DOCUMENTS

CN           1534487        10/2004
WO       WO2014/209406     12/2014

OTHER PUBLICATIONS

Korean Intellectual Property Office, Notice of Preliminary Rejection dated Apr. 11, 2016 in Korean Patent Application No. 2015-0083489. (Translation Redacted).
(Continued)

*Primary Examiner* — Raymond Phan
(74) *Attorney, Agent, or Firm* — Trop, Pruner & Hu, P.C.

(57) ABSTRACT

In an embodiment, an apparatus comprises: a first component to perform coherent operations; and a coherent fabric logic coupled to the first component via a first component interface. The coherent fabric logic may be configured to perform full coherent fabric functionality for coherent communications between the first component and a second component coupled to the coherent fabric logic. The first component may include a packetization logic to communicate packets with the coherent fabric logic, but not include coherent interconnect interface logic to perform coherent fabric functionality. Other embodiments are described and claimed.

22 Claims, 7 Drawing Sheets

(51) Int. Cl.
*G06F 15/78* (2006.01)
*G06F 13/42* (2006.01)
*G06F 9/44* (2018.01)

(52) U.S. Cl.
CPC ...... G06F 13/4068 (2013.01); G06F 13/4282 (2013.01); G06F 15/7825 (2013.01)

(56) References Cited

U.S. PATENT DOCUMENTS

| | | |
|---|---|---|
| 2004/0199727 A1 | 10/2004 | Narad |
| 2009/0168767 A1* | 7/2009 | Anders ............. G06F 15/17375 370/355 |
| 2014/0108744 A1 | 4/2014 | Moll |
| 2015/0006776 A1 | 1/2015 | Liu et al. |
| 2015/0074316 A1* | 3/2015 | Gaither ................... G06F 13/16 710/308 |
| 2015/0143051 A1 | 5/2015 | Liu et al. |
| 2016/0110275 A1* | 4/2016 | Michalovich ....... G06F 11/3656 714/43 |

OTHER PUBLICATIONS

State Intellectual Property Office of the People's Republic of China, First Office Action dated Jul. 4, 2017, in Chinese Patent Application No. 201510322930.3.

* cited by examiner

METHOD, APPARATUS AND SYSTEM FOR MODULAR ON-DIE COHERENT INTERCONNECT FOR PACKETIZED COMMUNICATION

This application claims priority to European Application No. EP14382274.0, filed Jul. 14, 2014, the content of which is hereby incorporated by reference.

TECHNICAL FIELD

This disclosure pertains to computing systems, and in particular (but not exclusively) to on-die interconnects.

DETAILED DESCRIPTION

Figure 1:
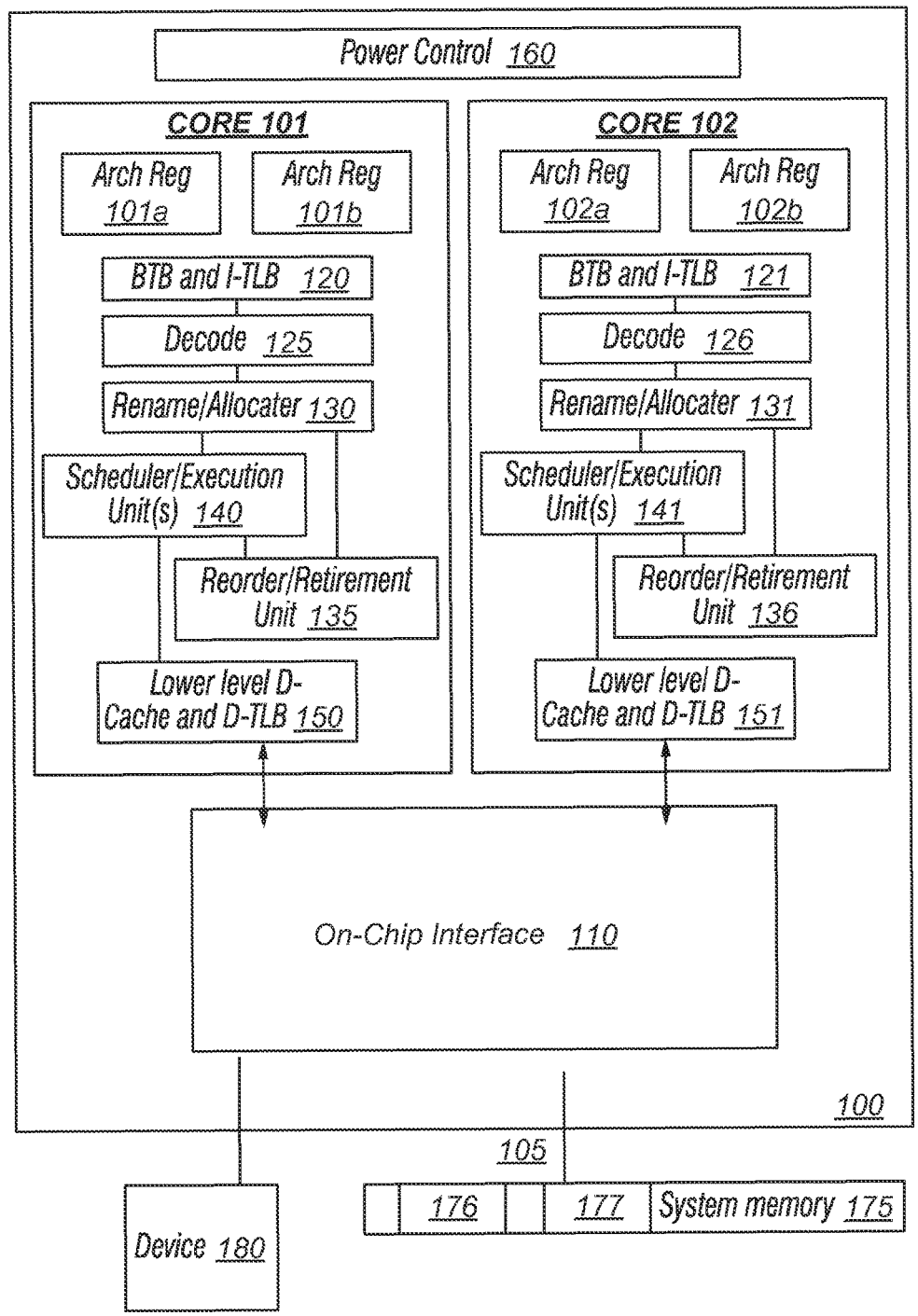
FIG. 1 is an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such as binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

One interconnect fabric architecture includes the PCIe architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

As processors such as SoCs grow in complexity in terms of core count and integration of new components on-die, uncore design and integration has also been growing in complexity and effort. While designers seek modularity and reuse of component blocks, one component of uncore integration involves connecting various functional components to an on-die coherent fabric. For this design aspect, designers typically perform ad hoc interface design between functional components and coherent fabric, which can involve custom design blocks for each component to connect to the fabric.

Embodiments provide a modular and scalable on-die interconnect solution that increases reuse and reduces design complexity and effort. According to various embodiments, functional components such as cores, integrated input output (IIO) agents, and/or memory may be coupled to a coherent fabric by abstracting all coherent fabric functionality into a single intellectual property (IP) block, referred to herein as a coherent fabric IP logic. Embodiments may also define a set of standard interfaces between functional components and coherent fabric IP block. In this way, an arbitrary size network topology may be designed having an arbitrary mix of components. Furthermore, embodiments enable reuse at both logical and physical levels of the coherent fabric IP block. Still further, embodiments may provide a plurality of configuration settings to tune the IP to a given product and to specific customer needs. In this way, coherent fabric functionality may be abstracted to enable ready transition to future coherent fabric technologies.

Since the on-die coherent interconnect can be abstracted away from the functional components, a modular IP block results having standardized interfaces to a variety of functional components, logically and physically partitioning the interconnect functionality. Using an embodiment, a coherent interconnect interface may be a standardized component interface, in contrast to a custom interface provided for each functional component. Still further, in an embodiment, a physical design of an interconnect logic enables various levels of reuse including a hard IP block across components, in contrast to custom physical design for each functional component.

Using an embodiment, validation of interconnect-related functionality may be done once given the standard interface and shared logic, instead of performing a separate validation for each component. Also modularity enables ease of designing a topology and adding new components to a design. Still further, interconnect technology may evolve in a manner that is abstracted from functional components, such that any interconnect-based technology changes are localized to the coherent fabric IP logic block. As such, modularization of the coherent fabric IP block and standardization of the interfaces may reduce overall coherent interconnect design and validation efforts.

Example interconnect fabrics and protocols can include a Peripheral Component Interconnect (PCI) Express (PCIe) architecture, Intel QuickPath Interconnect (QPI) architecture, Mobile Industry Processor Interface (MIPI), among others. A range of supported processors may be reached through use of multiple domains or other interconnects between node controllers.

An interconnect fabric architecture can include a definition of a layered protocol architecture. In one embodiment, protocol layers (coherent, non-coherent, and optionally other memory based protocols), a routing layer, a link layer, and a physical layer can be provided. Furthermore, the interconnect can include enhancements related to power management, design for test and debug (DFT), fault handling, registers, security, etc. In some embodiments of an on-die interconnect, the physical layer may not be present.

The physical layer of an interconnect fabric, in one embodiment, can be responsible for the fast transfer of information on the physical medium (electrical or optical etc.). The physical link is point-to-point between two link layer entities. The link layer can abstract the physical layer from the upper layers and provide the capability to reliably transfer data (as well as requests) and manage flow control between two directly connected entities. It also is responsible for virtualizing the physical channel into multiple virtual channels and message classes. The protocol layer can rely on the link layer to map protocol messages into the appropriate message classes and virtual channels before handing them to the physical layer for transfer across the physical links. The link layer may support multiple messages, such as a request, snoop, response, writeback, non-coherent data, etc.

In some implementations, a link layer can utilize a credit scheme for flow control. Non-credited flows can also be supported. With regard to credited flows, during initialization, a sender is given a set number of credits to send packets or flits to a receiver. Whenever a packet or flit is sent to the receiver, the sender decrements its credit counters by one credit which represents either a packet or a flit, depending on the type of virtual network being used. Whenever a buffer is freed at the receiver, a credit is returned back to the sender for that buffer type. When the sender's credits for a given channel have been exhausted, in one embodiment, it stops sending any flits in that channel. Essentially, credits are returned after the receiver has consumed the information and freed the appropriate buffers.

In one embodiment, a routing layer can provide a flexible and distributed way to route packets from a source to a destination. In some platform types (for example, uniprocessor and dual processor systems), this layer may not be explicit but could be part of the link layer; in such a case, this layer is optional. It relies on the virtual network and message class abstraction provided by the link layer as part of the function to determine how to route the packets. The routing function, in one implementation, is defined through implementation specific routing tables. Such a definition allows a variety of usage models.

In one embodiment, the protocol layer can implement the communication protocols, ordering rules, and coherency maintenance, I/O, interrupts, and other higher-level communication. Note that the protocol layer, in one implementation, can provide messages to negotiate power states for components and the system. As a potential addition, the physical layer may also independently or in conjunction set power states of the individual links.

Multiple agents may be connected to an interconnect architecture, such as a home agent (orders requests to memory), caching agent (issues requests to coherent memory and responds to snoops), configuration agent (deals with configuration transactions), interrupt agent (processes interrupts), legacy agent (deals with legacy transactions), non-coherent agent (deals with non-coherent transactions), and others. Note that the various agents may not include any coherent fabric functionality, and thus also no link layer. Stated another way, using a coherent fabric IP logic in accordance with one embodiment, link layer and/or physical layer functionality may be abstracted away from the functional components.

Figure 2:
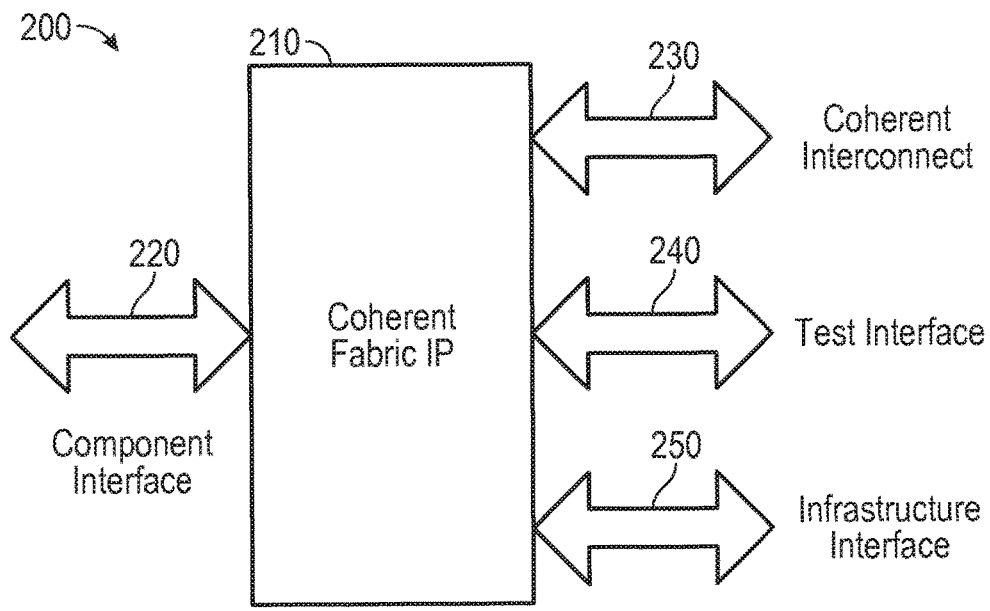
FIG. 2 is a block diagram of a portion of a system including coherent fabric IP logic in accordance with an embodiment.

Referring now to FIG. 2, shown is a block diagram of a portion of a system including coherent fabric IP logic in accordance with an embodiment. As shown in FIG. 2, a portion of a system 200 includes a coherent fabric IP logic 210 that may include all coherent fabric functionality in this single IP block. In this way, individual functional components that couple to this coherent fabric need not include logic for interfacing with the coherent fabric.

As illustrated in FIG. 2, coherent fabric IP logic 210 is coupled to a component interface 220 that in turn couples to one or more coherent components. Although the scope of the present invention is not limited in this regard, coherent functional components that may be coupled via such coherent interface include cores, caching agents, and other coherent agents. Further, understand that while only a single component interface 220 is shown in the embodiment of FIG. 2, it is possible for a coherent fabric IP logic to couple to multiple coherent components via separate component interfaces.

Still referring to FIG. 2, coherent fabric IP logic 210 is further coupled to a coherent interconnect 230. In an embodiment, this coherent interconnect, which may be implemented by any given interconnect topology, such as a point-to-point interconnect, mesh interconnect, ring interconnect, ring mesh interconnect, or bus interconnect (or combinations thereof), may couple to other instantiations of a coherent fabric IP logic. In addition, coherent fabric IP logic 210 may couple to a test circuitry (either integrated on the same IC or in an external device) via a test interface 240. Still further, coherent fabric IP logic 210 may couple to additional infrastructure such as other portions of an SoC such as clocking, reset, power, register access, performance monitoring and so forth, via an infrastructure interface 250. Understand that while shown with this particular implementation in the embodiment of FIG. 2, a coherent fabric IP logic block may interconnect to additional or different interfaces in other embodiments.

Figure 3:
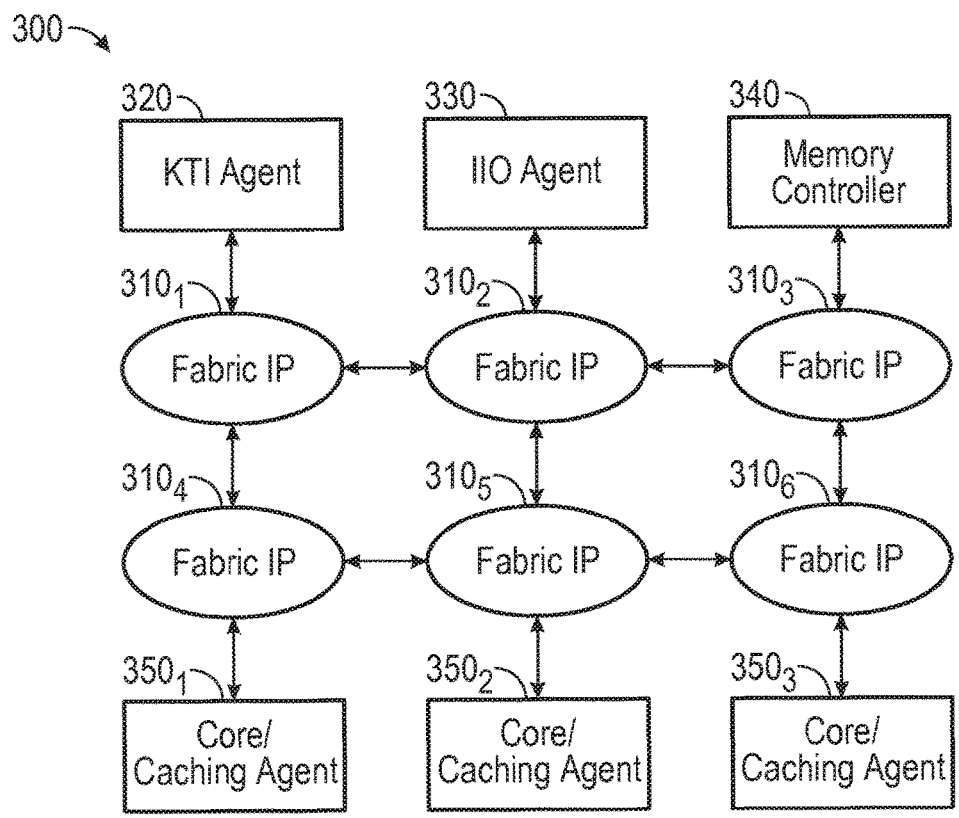
FIG. 3 is a high level block diagram of a mesh interconnect implementation of multiple fabric IP logics in accordance with an embodiment.

Referring now to FIG. 3, shown is a high level block diagram of a mesh interconnect implementation of multiple fabric IP logics within an SoC in accordance with an embodiment. As seen in FIG. 3, arrangement 300 may be all or a portion of a SoC or other IC including multiple fabric IP logics 310. More specifically, a plurality of fabric IP logics $310_1$-$310_6$ are present in the FIG. 3 embodiment. Of course, understand that the number of instantiated fabric IP logic blocks may vary in different embodiments. It is further possible to reduce the number of instantiated fabric IP logic blocks, e.g., to reduce real estate and/or power consumption, by providing an implementation in which multiple components couple to a single fabric IP logic block. Each of these instantiations may be of identical design.

In the embodiment of FIG. 3, note that a single functional component is coupled to each fabric IP logic 310. Starting in a clockwise fashion from the top left of FIG. 3, a fabric IP logic $310_1$ couples to a coherent agent 320. In an embodiment, coherent agent 320 may be an agent in accordance with a Quick Path Interconnect (QPI)/Keizer Technology Interface (KTI) protocol to interface coherently with another processor such as another SoC or other multicore processor in a multiprocessor system. Fabric IP logic $310_2$ couples to an integrated I/O agent 330. Fabric IP logic $310_3$ couples to a memory controller 340 that in turn may interface with an off-chip memory such as a dynamic random access memory (DRAM) or other such system memory.

In turn, fabric IP logics $310_4$-$310_6$ each couple to a corresponding core/caching agent $350_1$-$350_2$. Note that the interconnection between a given coherent fabric IP logic block and a corresponding component may be via a component interface. In addition, each coherent fabric IP logic block may couple to one or more other fabric IP logic blocks (here 2 each) via a coherent interconnect. With the modular and scalable interconnection of components via multiple instantiations of coherent fabric IP logic 310, the coherent interconnect functionality of coherent fabric IP logic may remain completely transparent to the functional components, such that they are unaware of the details of the interconnect such that the interconnect coupling itself is also transparent to the functional components. Instead, communication with the functional components may be via a standardized component interface. This standardized component interface and the abstraction of the coherent interconnect enables any arbitrary IP block (even from third party vendors) to be seamlessly connected to the coherent fabric IP logic blocks. Of course, in some embodiments minimal glue logic may be provided to enable interface of the third party IP logic into a given SoC design. Note the third party may be an entity other than an entity that designs and/or manufactures the SoC.

In general, the standardized interface may communicate basic packets to and from packetization logic of a functional component, which may include add and drop logic to respectively add or drop packets to/from the coherent interface. While shown with this particular implementation in FIG. 3, understand that many variations and alternatives are possible. For example, instead of a mesh-based interconnect as in FIG. 3, a ring, torus or other interconnect topology may be used.

Figure 4:
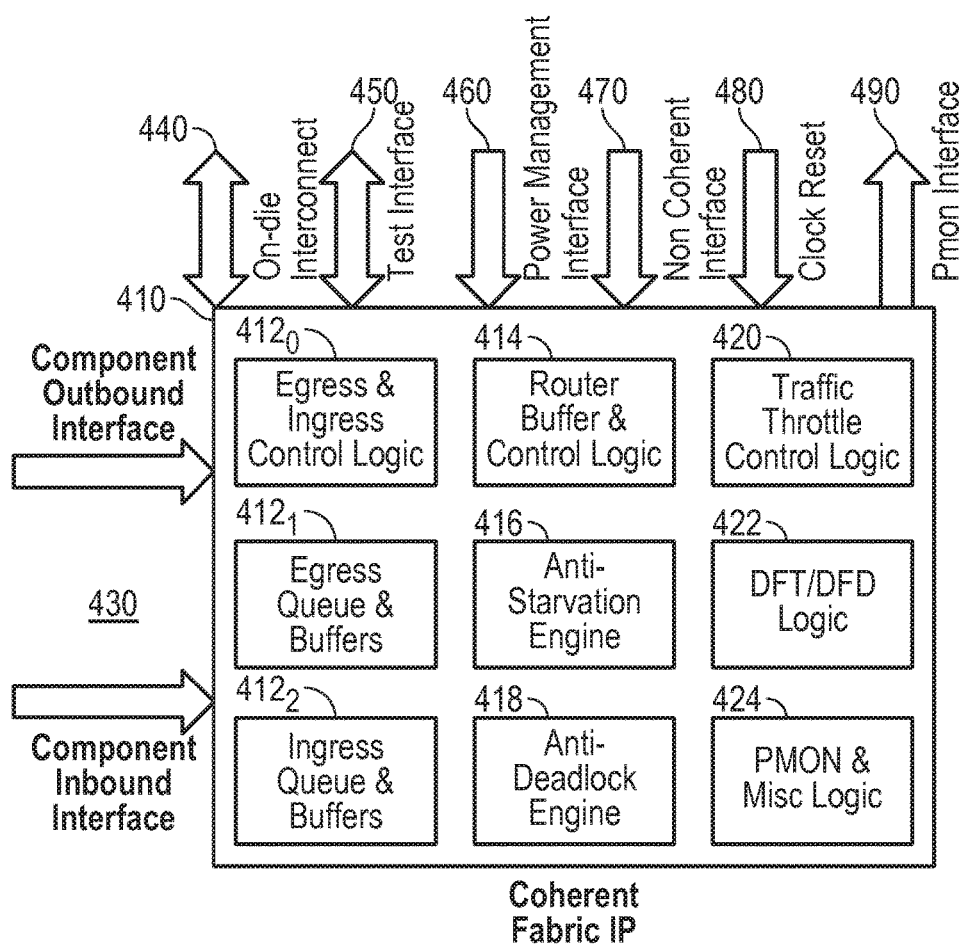
FIG. 4 is a block diagram showing further details of a coherent fabric IP logic block in accordance with an embodiment.

Referring now to FIG. 4, shown is a block diagram of further details of a coherent fabric IP logic block in accordance with an embodiment. As shown in FIG. 4, coherent fabric IP logic 410 itself is formed of constituent components including various queues, buffers and other structures, in addition to various control logic. In various embodiments, coherent fabric IP logic 410 may be configured to enforce coherency and ordering on the fabric based on a given set of coherent protocol rules. Furthermore, coherent fabric IP logic 410 performs end-to-end routing of packets and may also handle all associated functionality, such as network fairness, deadlock avoidance, traffic modulation, among other interconnect functions.

In this way, embodiments provide the ability to "plug-and-play" with already existing functional components or high level models in a pre-silicon development phase. As a result, a dynamically evolving model for validation may be realized in which one or more of the functional components are already fully designed, while still maintaining a fully functional interconnect.

As seen, a plurality of egress and ingress queues and buffers $410_0$-$410_1$ may be present. Understand that in various implementations, the number and size of such queues and buffers may be controlled, e.g., dynamically based on system conditions. Still further, in some embodiments the enabled size of such queues and buffers may be fixed according to configuration controls to provide for a desired size for particular system implementations. In an embodiment, these queues and buffers $412_1$-$412_2$ are under control of an egress and ingress control logic $412_0$. In an embodiment, ingress queues and buffers $412_2$ (which may be optional) may be configured to queue up packets from the network to the component (and from component to network via egress queues and buffers $412_1$).

Still referring to FIG. 4, coherent fabric IP logic 410 further includes a router buffer and control logic 414 that may be configured to perform control of routing and buffering. Router buffer and control logic 414 may be configured to pass packets that are flowing through to a final destination. Coherent fabric IP logic 410 further includes an anti-starvation engine 416 and an anti-deadlock engine 418 configured to perform anti-starvation and anti-deadlock functionality, respectively. Anti-starvation logic 416 may be configured to handle fairness for injecting packets into the interconnect as well as sinking packets into a component. Anti-deadlock logic 418 may be configured to ensure deadlock-free routing by providing anti-deadlock functionality.

As further shown in FIG. 4, coherent fabric IP logic 410 further includes a traffic throttle control logic 420 that may be configured to throttle traffic, e.g., based on various monitored parameters of a system. Traffic throttle logic 420 may be configured to modulate the traffic injection rate from the components to prevent hot spots. Coherent fabric IP logic 410 further includes a design for test/design for debug (DFT/DFD) logic 422 that may be configured to perform various test and other functionality. DFT/DFD logic 422 may be configured to provide a test and debug infrastructure with standardized interfaces for easy testing and debug. Still further, coherent fabric IP logic 410 also includes a performance monitor and additional logic 424, which may be configured to perform performance monitoring activities with regard to the coherent fabric IP logic blocks and the coherent interconnect more generally.

In an embodiment, additional logic within logic 424 may include configuration logic, including a configuration control logic and a non-volatile configuration storage. In certain embodiments, configuration information may be received via a non-coherent interface 470 for communication of configuration messages. In an embodiment, these messages may include configuration information to be stored in the non-volatile storage. Examples of configuration information include router buffer sizes and latency configuration values, anti-starvation thresholds, various disable and enable controls for certain queues, buffers and so forth, interconnect configuration controls, such as number of ring stops, routing configuration information, traffic throttling control information (such as traffic thresholds), among other such configuration information.

Note that this configuration information may be stored within a non-volatile storage of a given coherent fabric IP logic and used by a corresponding configuration control logic to configure the fabric for operation. For example, traffic throttle logic 420 may throttle traffic based on one or more traffic thresholds. In an embodiment, such thresholds may be obtained in a configuration message and stored in a configuration storage of coherent fabric IP logic 410. Also note that the above-described control logics within a coherent fabric IP logic block may be implemented in hardware, software, firmware, and any combinations thereof.

As further shown in FIG. 4, coherent fabric IP logic 410 may couple to a given coherent component via a component interface 430, which as seen is formed via an outbound interface and an inbound interface. In addition to this interface, coherent fabric IP logic 410 further interfaces with an on-die interconnect 440 (which may be any appropriate type of interconnect topology), a test interface 450, a power management interface 460, a non-coherent interface 470, a clock interface 480, and a performance monitoring interface 490. Of course understand that many different types of interfaces may be present in different implementations.

In various embodiments, coherent fabric IP logic 410 may provide for many configurability knobs to tune design parameters such as queue sizes, bypasses, and so forth, to meet product specific requirements. In this way, a single designed logic block may serve diverse product requirements such as high bandwidth and/or low latency for certain processor families.

Figure 5:
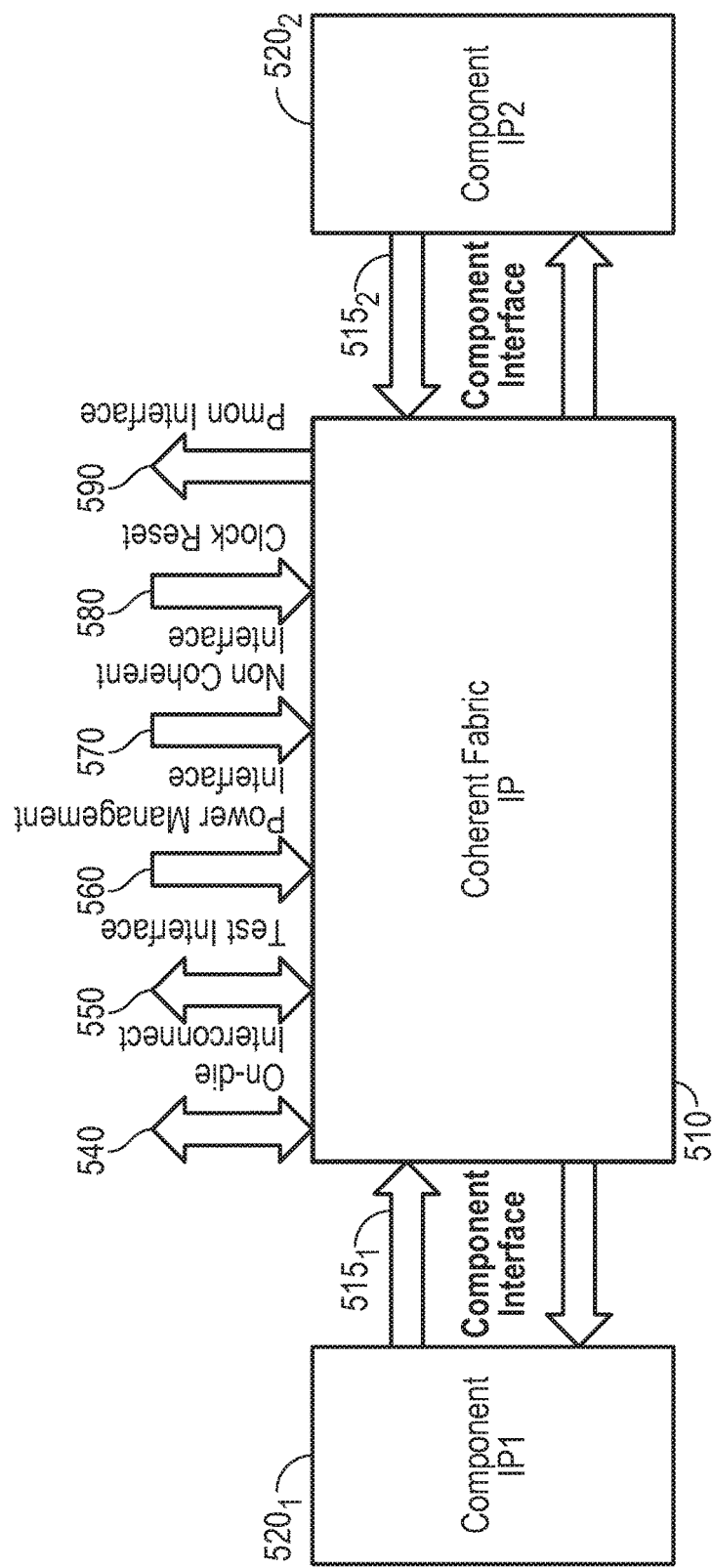
FIG. 5 is a block diagram of a coherent fabric IP logic block in accordance with another embodiment.

Referring now to FIG. 5, shown is a block diagram of a coherent fabric IP logic block in accordance with another embodiment. As shown in FIG. 5, coherent fabric IP logic 510 is a dual-headed logic that can directly interface to multiple coherent components, namely components $520_1$ and $520_2$. In an embodiment, each component 520 may be a given core/caching agent. Of course understand that in other implementations, the coherent components may be different. As seen, coherent fabric IP logic 510 couples to components 520 by corresponding component interfaces $515_1$ and $515_2$. In addition, interfaces can be made to other components of a SoC or other IC via on-die interconnect 540, test interface 550, power management interface 560, non-coherent interface 570, clock interface 580, and performance monitor interface 590. While a dual-headed implementation is shown in FIG. 5, understand that in still further implementations a coherent fabric IP interface logic block may communicate with more than two coherent components, each via a dedicated component interface.

Figure 6:
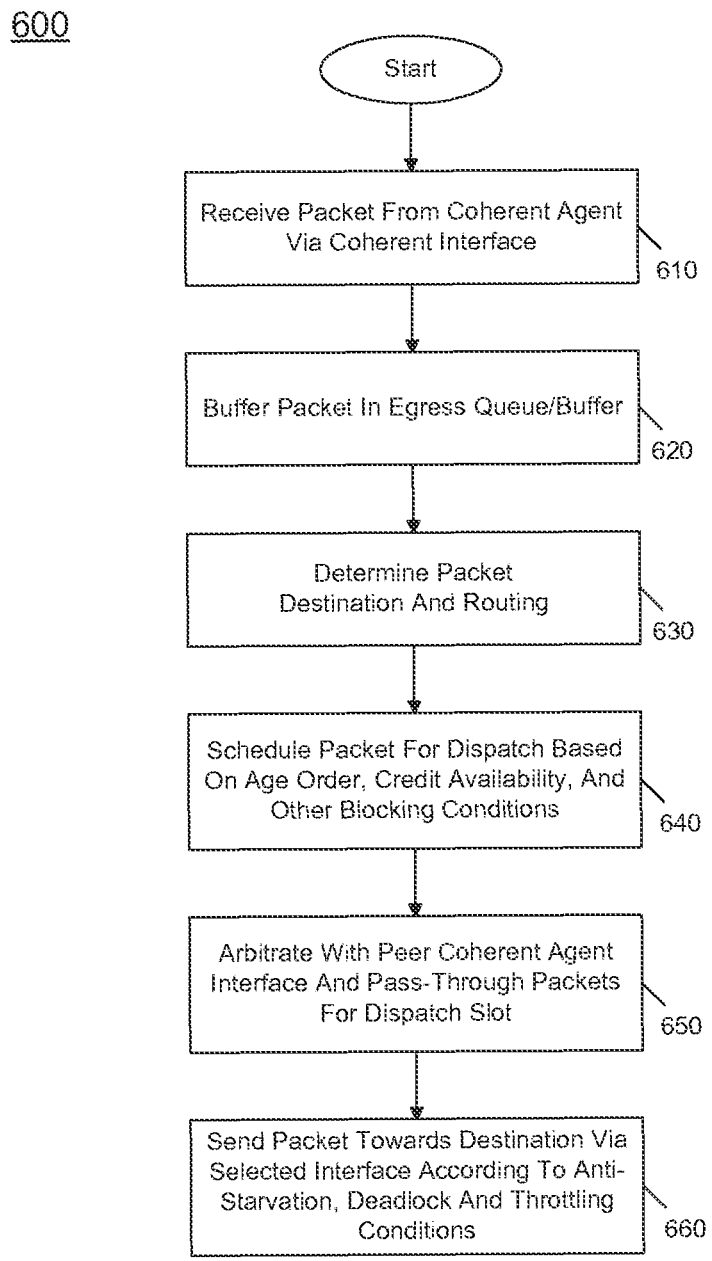
FIG. 6 is a flow diagram of a method in accordance with an embodiment.

Referring now to FIG. 6, shown is a flow diagram of a method in accordance with an embodiment. More specifically, method 600 of FIG. 6 may be implemented within coherent fabric IP logic as described herein. In general, method 600 may be used to receive, process and forward outbound packets from various coherent agents in a system. Note that these various coherent agents do not have any interconnect-based logic (including no link and physical layer functionality), other than minimal packetization logic to packetize information for communication to a corresponding coherent fabric IP logic block. Understand that the packet format may be generic and may simply include a basic header to identify source and destination (and optionally other routing information, such as intermediate router IDs, starvation handling hints, and address information) and the payload information to be communicated to the destination. Although the scope of the present invention is not limited in this regard, in an embodiment, packets may be formed of 10 bytes, with a relatively minimal 3 byte header and a remainder formed of a payload.

Referring to FIG. 6, method 600 begins by receiving a packet from a coherent agent via a coherent interface (block 610). Note that this coherent agent may be any type of agent such as core, specialized function unit, KTI agent, caching agent or so forth. In any case, the agent may be interconnect-agnostic in that such agent does not include any interconnect-based logic, other than the above-mentioned minimal packetization logic. The received packet may be provided for buffering in an egress queue/buffer (block 620). Note that the buffer may store the entire payload, while the queue stores minimal information to enable scheduling and routing. Next, various logic within the coherent fabric IP logic may determine a packet destination and routing (block 630). As discussed above, the received packet may include a destination identifier from which the destination may be determined. Furthermore, based on routing logic within the coherent fabric IP logic block, a best routing to the destination may be determined.

Next, the packet may be scheduled for dispatch based on a variety of factors including one or more of age order, credit availability, and other blocking conditions (block 640). Next, an arbitration may be performed with peer coherent agent interface(s) connected to another coherent agent and pass-through packets (if any) for a dispatch slot (block 650). Finally, at block 660 the packet may be sent towards the destination via a selected interface. Note that this destination may be another coherent agent directly coupled to the same coherent fabric IP logic such that there is a direct communication to the destination. In other cases, the destination may be more remotely located such that the communication may pass through multiple hops, including multiple coherent fabric IP logic blocks and/or other agents to reach its destination. Furthermore, note that the packet may be sent according to one or more of anti-starvation, anti-deadlock, and throttling conditions that may be present within the local coherent fabric IP logic block as well as other such blocks within a system. Although shown at this high level in the embodiment of FIG. 6, understand that many variations and alternatives are possible.

Figure 7:
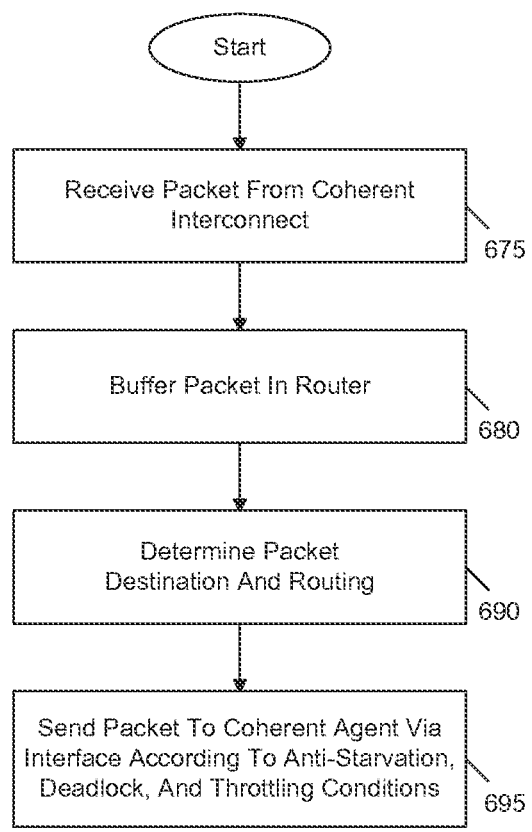
FIG. 7 is a flow diagram of a method in accordance with another embodiment.

Referring now to FIG. 7, shown is a flow diagram of a method in accordance with another embodiment. More specifically, method 670 of FIG. 7 may be implemented within coherent fabric IP logic. In general, method 670 may be used to handle receipt and processing of inbound packets directed to an agent directly coupled to a coherent fabric IP logic. As seen, method 670 begins by receiving a packet from a coherent interconnect (block 675). Next, the packet may be buffered into the router of the coherent fabric IP logic (block 680). Thereafter packet destination and routing may be determined (block 690). Thereafter, at block 695 the packet may be sent to the coupled coherent agent via the coherent interface (block 695). As discussed above this communication may be according to anti-starvation, anti-deadlock, and throttling conditions present in the local coherent fabric IP logic block. Although shown at this high level in the FIG. 7 embodiment, understand that the scope of the present invention is not limited in this regard.

Figure 8:
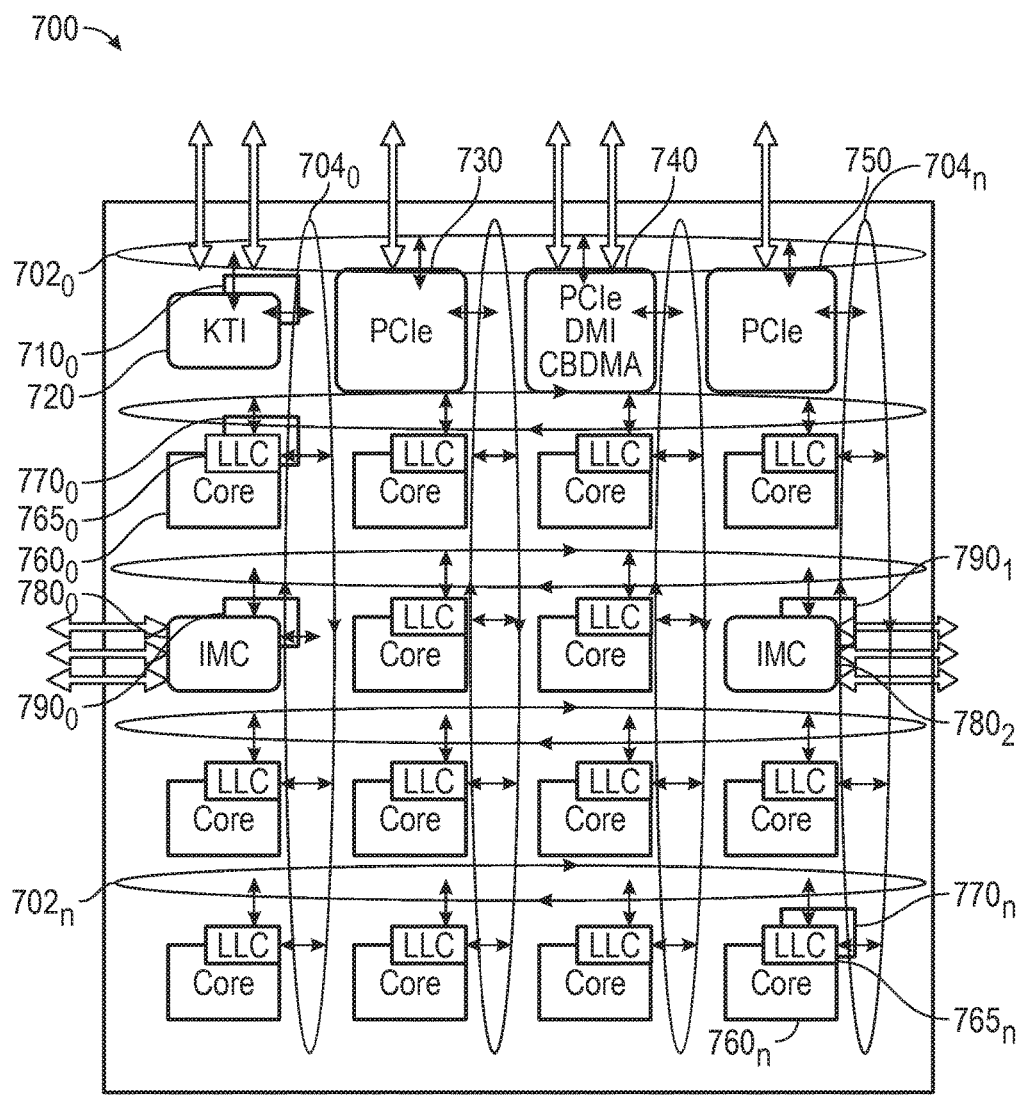
FIG. 8 is a block diagram of an SoC in accordance with one embodiment of the present invention.

Referring now to FIG. 8, shown is a block diagram of an SoC in accordance with one embodiment of the present invention. As seen in FIG. 8, SoC 700 is a multi-core SoC that further includes an integrated memory controller, as well as other components. More specifically, SoC 700 is formed of a mesh-based interconnect topology including a horizontal interconnect fabric $702_0$-$702_n$, and a vertical interconnect fabric $704_0$-$704_n$, e.g., horizontal and vertical rings.

Various coherent agents are present, including a KTI agent 720, a PCIe agent 730, a PCIe/direct media interface (DMI)/direct memory access agent 740, and another PCIe agent 750. Each of these agents may communicate with one or more off-chip devices according to the appropriate protocol. Note that each of the agents is also coupled to its own corresponding instantiation of a coherent fabric IP logic $710_0$-$710_n$ (only one representative logic is shown in FIG. 8). Understand that each of these fabric IP logic blocks may be identically configured.

Still referring to FIG. 8, SoC 700 further includes a plurality of cores $760_0$-$760_n$. As seen, each core is associated with a corresponding shared cache, e.g., a last level cache (LLC) $765_0$-$765_n$. In an embodiment, this LLC may be implemented in a slice-based manner such that, although centrally located, each core has a dedicated slice. In addition, a coherent fabric IP logic $770_0$-$770_n$ (only one representative logic is shown in FIG. 8) is associated with each core.

Also shown in FIG. 8 is an integrated memory controller $780_0$-$780_1$, each of which also has its own corresponding coherent fabric IP logic $790_0$-$790_1$. Understand that while shown as a 14 core die in the embodiment of FIG. 8, more or fewer cores and other coherent agents may be present in a particular embodiment.

Using an on-die coherent interconnect in accordance with an embodiment may enable very high levels of IP integration into a processor or other SoC with reduced design cycles. Such shorter design cycles may be realized in part via a modular, scalable and reusable coherent fabric IP logic block as described herein, with reduced effort and complexity in integration.

The following examples pertain to further embodiments.

In one example, an apparatus comprises: a first component to perform coherent operations; and a coherent fabric logic coupled to the first component via a first component interface, the coherent fabric logic to perform full coherent fabric functionality for coherent communications between the first component and a second component to be coupled to the coherent fabric logic, the first component including a packetization logic to communicate packets with the coherent fabric logic without a coherent interconnect interface logic that is to perform coherent fabric functionality.

In an example, the coherent fabric logic comprises: a plurality of queues; a plurality of buffers; and a control logic to enable less than all of the plurality of queues and less than all of the plurality of buffers, based on configuration information. The coherent fabric logic may further include: an anti-starvation logic to prevent starvation of resources; an anti-deadlock logic to prevent deadlocks; and a router buffer and a control logic to control the router buffer.

In an example, the packetization logic is to provide first packets to the first component interface and to receive second packets from the first component interface, the first component interface including an outbound interface and an inbound interface.

In an example, the coherent fabric logic is to couple to an on-die interconnect, a test interface, a power management interface, a non-coherent interface, a clock interface, and a performance monitor interface. A first coherent fabric logic and a second coherent fabric logic may be coupled via the on-die interconnect, where the on-die interconnect comprises a first ring to communicate in a first direction and a second ring to communicate in a second direction. The coherent fabric logic may further comprise a configuration logic to configure one or more parameters of the coherent fabric logic based on configuration settings stored in a configuration storage of the apparatus, the configuration settings received via the non-coherent interface.

In an example, the apparatus comprises a plurality of coherent fabric logics each to perform the full coherent fabric functionality, each of the plurality of coherent fabric logics to couple to at least one coherent component.

In an example, the second component may be configured to perform coherent operations, where the coherent fabric logic is coupled to the second component via a second component interface.

In an example, the apparatus comprises a SoC, and the first component comprises an IP logic of a third party to the SoC manufacturer.

In an example, the apparatus may be a processor implemented using various means. In an example, the processor may be incorporated in a user equipment touch-enabled device.

In another example, a system comprises a display and a memory, and includes the processor of one or more of the above examples.

In another example, a method comprises: receiving, in a coherent fabric logic of a system, a packet from a first coherent agent destined to a second coherent agent of the system via a coherent fabric coupled between the first coherent agent and the coherent fabric logic, the first coherent agent, the second coherent agent and the coherent fabric logic configured on a single die; and performing all coherent fabric functionality in the coherent fabric logic, where the coherent fabric functionality is transparent to the first and second coherent agents.

In an example, the method further comprises determining, in the coherent fabric logic, a destination and routing for the packet.

In an example, the method further comprises arbitrating with a peer coherent agent interface and one or more pass-through packets for a dispatch slot to send the packet to the second coherent agent.

In an example, the method further comprises scheduling the packet for dispatch based on at least one of age order and credit availability.

In an example, the method further comprises sending the packet towards the second coherent agent via a selected interface according to one or more of anti-starvation, deadlock and throttling conditions of the coherent fabric.

In another example, a computer readable medium including instructions is to perform the method of any of the above examples.

In another example, an apparatus comprises means for performing the method of any one of the above examples.

In another example, a SoC comprises: a first coherent agent to perform coherent operations; a second coherent agent to perform coherent operations; a first coherent fabric logic coupled to the first coherent agent via a first coherent interface; and a second coherent fabric logic coupled to the second coherent agent via a second coherent interface, the first and second coherent fabric logics coupled via a coherent fabric and comprising multiple instantiations of a single logic to perform full coherent fabric functionality, and where the first and second coherent agents are without coherent fabric logic to perform coherent fabric functionality.

In an example, the first coherent agent is an IP logic of a third party to a designer of the SoC.

In an example, the SoC further comprises a third coherent agent to perform coherent operations, the third coherent agent coupled to the first coherent fabric logic via a third coherent interface.

In an example, the first and second coherent fabric logics each comprise a link layer logic, where the first and second coherent agents are without link layer logic.

In an example, the first coherent agent comprises a packetization logic to add first packets to the first component interface and drop second packets from the first component interface.

In an example, the SoC further comprises a non-coherent interface coupled to the first coherent fabric logic, where the first coherent fabric logic comprises a configuration control logic to receive a configuration message via the non-coherent interface and store a plurality of configuration values in a configuration storage of the first coherent fabric logic.

In an example, the first coherent fabric logic comprises a traffic throttle logic to throttle traffic according to at least one throttle threshold, the at least one throttle threshold obtained from the plurality of configuration values.

In an example, the SoC may be included in a portable computing system.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a first component to perform coherent operations; and
   a coherent fabric logic coupled to the first component via a first component interface, the coherent fabric logic to perform full coherent fabric functionality for coherent communications between the first component and a second component to be coupled to the coherent fabric logic, the first component including a packetization logic to communicate packets with the coherent fabric logic without a coherent interconnect interface that is to perform coherent fabric functionality, wherein the packetization logic is to provide first packets to the first component interface and to receive second packets from the first component interface, the first component interface including an outbound interface and an inbound interface.

2. The apparatus of claim 1, wherein the coherent fabric logic comprises:
   a plurality of queues;
   a plurality of buffers; and
   a control logic to enable less than all of the plurality of queues and less than all of the plurality of buffers, based on configuration information.

3. The apparatus of claim 1, wherein the coherent fabric logic is to couple to an on-die interconnect, a test interface, a power management interface, a non-coherent interface, a clock interface, and a performance monitor interface.

4. The apparatus of claim 1, wherein the apparatus comprises a plurality of coherent fabric logics each to perform the full coherent fabric functionality, each of the plurality of coherent fabric logics to couple to at least one coherent component.

5. The apparatus of claim 1, further comprising the second component to perform coherent operations, wherein the coherent fabric logic is coupled to the second component via a second component interface.

6. The apparatus of claim 1, wherein the apparatus comprises a system on chip (SoC), and the first component comprises an intellectual property (IP) logic of a third party to the SoC manufacturer.

7. The apparatus of claim 1, wherein the packetization logic is to communicate coherent packets with the coherent fabric logic via the first component interface.

8. The apparatus of claim 2, wherein the coherent fabric logic comprises:
   an anti-starvation logic to prevent starvation of resources;
   an anti-deadlock logic to prevent deadlocks; and
   a router buffer and a control logic to control the router buffer.

9. The apparatus of claim 3, wherein a first coherent fabric logic and a second coherent fabric logic are coupled via the on-die interconnect, wherein the on-die interconnect comprises a first ring to communicate in a first direction and a second ring to communicate in a second direction.

10. The apparatus of claim 3, wherein the coherent fabric logic further comprises a configuration logic to configure one or more parameters of the coherent fabric logic based on configuration settings stored in a configuration storage of the apparatus, the configuration settings received via the non-coherent interface.

11. A method comprising:
receiving, in a coherent fabric logic of a system, a packet from a first coherent agent destined to a second coherent agent of the system via a coherent fabric coupled between the first coherent agent and the coherent fabric logic, the first coherent agent, the second coherent agent and the coherent fabric logic configured on a single die;
performing all coherent fabric functionality in the coherent fabric logic, wherein the coherent fabric functionality is transparent to the first and second coherent agents; and
scheduling the packet for dispatch based on at least one of age order and credit availability.

12. The method of claim 11, further comprising determining, in the coherent fabric logic, a destination and routing for the packet.

13. The method of claim 11, further comprising sending the packet towards the second coherent agent via a selected interface according to one or more of anti-starvation, deadlock and throttling conditions of the coherent fabric.

14. The method of claim 12, further comprising arbitrating with a peer coherent agent interface and one or more pass-through packets for a dispatch slot to send the packet to the second coherent agent.

15. A system on chip (SoC) comprising:
a first coherent agent to perform coherent operations;
a second coherent agent to perform coherent operations;
a first coherent fabric logic coupled to the first coherent agent via a first coherent interface; and
a second coherent fabric logic coupled to the second coherent agent via a second coherent interface, the first and second coherent fabric logics coupled via a coherent fabric and comprising multiple instantiations of a single logic to perform full coherent fabric functionality, and wherein the first and second coherent agents without coherent fabric logic to perform coherent fabric functionality.

16. The SoC of claim 15, wherein the first coherent agent is an intellectual property (IP) logic of a third party to a designer of the SoC.

17. The SoC of claim 15, further comprising a third coherent agent to perform coherent operations, the third coherent agent coupled to the first coherent fabric logic via a third coherent interface.

18. The SoC of claim 15, wherein the first coherent fabric logic and the second coherent fabric logic each comprises a link layer logic, the first and second coherent agents without link layer logic.

19. The SoC of claim 15, further comprising a non-coherent interface coupled to the first coherent fabric logic, wherein the first coherent fabric logic comprises a configuration control logic to receive a configuration message via the non-coherent interface and store a plurality of configuration values in a configuration storage of the first coherent fabric logic.

20. The SoC of claim 15, further comprising a portable computing system including the SoC.

21. The SoC of claim 18, wherein the first coherent agent comprises a packetization logic to add first packets to the first component interface and drop second packets from the first component interface.

22. The SoC of claim 19, wherein the first coherent fabric logic comprises a traffic throttle logic to throttle traffic according to at least one throttle threshold, the at least one throttle threshold obtained from the plurality of configuration values.

\* \* \* \* \*